United States Patent Office 3,813,436
Patented May 28, 1974

3,813,436
PHENYLUREA DERIVATIVES AND PROCESS FOR THEIR MANUFACTURE
Dieter Duerr, Bottmingen, and Erwin Nikles, Liestal, Switzerland, assignors to Ciba-Geigy AG, Basel, Switzerland
No Drawing. Filed May 19, 1971, Ser. No. 145,007
Claims priority, application Switzerland, May 21, 1970, 7,522/70
Int. Cl. C07c 127/00
U.S. Cl. 260—553 A         3 Claims

ABSTRACT OF THE DISCLOSURE

Compounds of the formula

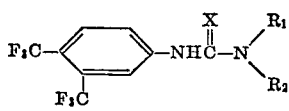

wherein X represents oxygen or sulphur, $R_1$ represents hydrogen, a lower alkyl, alkenyl, alkinyl or alkoxy radical and $R_2$ represents a lower alkyl or alkenyl radical, or $R_1$ and $R_2$ together with the nitrogen atom to which they are bound form an optionally substituted heterocyclic ring and/or a heterocyclic ring interrupted by oxygen or sulphur.

---

The invention relates to new phenylurea derivatives, their manufacture and use as active substances in selective herbicidal agents. The new phenylureas correspond to the formula

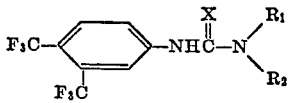

wherein X represents oxygen or sulphur, $R_1$ represents hydrogen, a lower alkyl, alkenyl, alkinyl or alkoxy radical and $R_2$ represents a lower alkyl or alkenyl radicals, or $R_1$ and $R_2$ together with the nitrogen atom to which they are bound form an optionally substituted heterocyclic ring and/or a heterocyclic ring interrupted by oxygen or sulphur.

By alkyl, alkenyl, alkinyl and alkoxy radicals are to be understood those radicals that possess 1 to 4, respectively 2 to 4 carbon atoms, and can be straight-chain or branched, for example methyl, ethyl, n-propyl, i-propyl, n-butyl, isobutyl, allyl, methallyl, chloroallyl, butinyl, 2-propinyl, etc.

Particular interest attaches to compounds of the formula

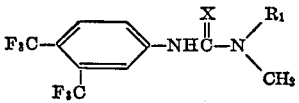

wherein X has the meaning given above, and $R_1$ represents hydrogen, methyl, methoxy or iso-butinyl.

Examples of compounds of the formula (I) are listed in the following table:

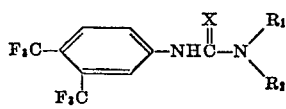

| $R_1$ | $R_2$ | X |
|---|---|---|
| $CH_3$ | H | S |
| $CH_3$ | H | O |
| $C_2H_5$ | H | O |
| $C_3H_7$-n | H | O |
| $C_3H_7$-i | H | O |
| $C_4H_9$-n | H | O |
| $CH_2=CH-CH_2-$ | H | O |
| $-CH\begin{smallmatrix}CH_3\\C\equiv CH\end{smallmatrix}$ | H | O |
| $CH_3$ | $CH_3$ | O |
| $CH_3$ | $CH_3$ | S |
| $CH_3$ | $OCH_3$ | O |
| $CH_3$ | $OCH_3$ | S |
| $CH_3$ | $-CH\begin{smallmatrix}CH_3\\C\equiv CH\end{smallmatrix}$ | O |
| $CH_3$ | $-CH\begin{smallmatrix}CH_3\\C\equiv CH\end{smallmatrix}$ | S |
| $CH_3$ | $-CH_2-CH=CH_2$ | O |
| $CH_3$ | $-CH_2-C=CH_2$ $\;\;\;\;\;\;\;\;\;\;\;\;\;\;\;\;\;\;\;CH_3$ | O |
| $CH$ | $-O-CH_2-CH=CH_2$ | O |
| $CH_3$ | $O-CH_2-C=CH_2$ $\;\;\;\;\;\;\;\;\;\;\;\;\;\;\;\;\;\;\;CH_3$ | O |
| $CH_3$ | $-CH=C\begin{smallmatrix}CH_3\\CH_3\end{smallmatrix}$ | O |
| $CH_3$ | $-CH=CHCH_3$ | O |
| | ⌬N— | O |
| | O⌬N— | O |
| | ⌬N— | S |
| | O⌬N— | S |
| | ⌬N—CH_3 | O |
| | ⌬N—O | O |
| | ⌬N—S | O |

The phenylureas of the formula (I) are manufactured according to known methods, as is illustrated by the following scheme:

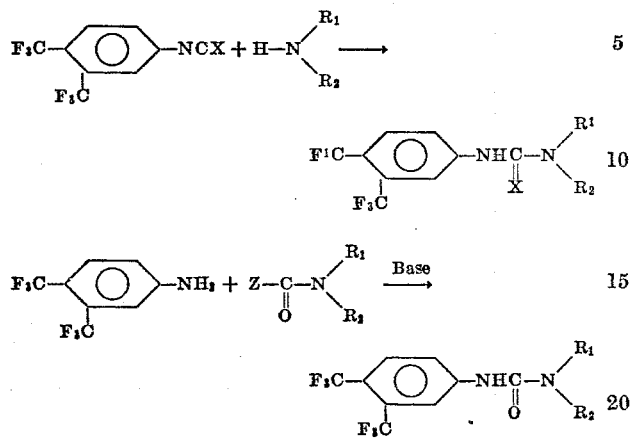

or quite generally

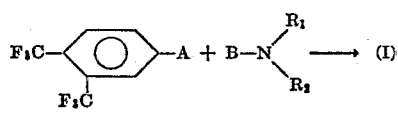

Herein $R_1$ and $R_2$ have the meaning mentioned above, Z represents a starting group such as chlorine, bromine or iodine, and A and B represent radicals that are able to form with one another the urea resp. thiourea group, accompanied by addition or condensation. The nitro compound based on 3,5-bis-trifluoromethyl-phenylisocyanate has been described by Yagupol'skij et al., Zh. obs. khi. 38, 2053 (1969), and the aniline resulting from it by means of Pd/C is methanol is likewise known; its phosgenation to the isocyanate (cold/warm) is a reaction with which the expert is familiar.

The compounds of the formula (I) have a broad activity spectrum and can be used to combat vegetable pests of the most diverse kind.

This herbicidal activity can be total or selective. A total herbicidal and also defoliating activity is also observed when higher rates of application are used. Such activity is always advantageous whenever the soil is to be prepared for a new planting while remains of a previous crop are still present. The selective herbicidal activity is attainable both in the pre-emergent and post-emergent processes and is particularly observed in important large-scale crops such as grain, rice and maize, soya, cotton and similar crops. Here the rates of application can vary within wide limits for example between 0.1 to 10 kg. of active substance per hectare; but preferably 0.5 to 5 kg. per hectare are used.

The active substances of the formula (I) of the invention can also be used for influencing plant growth, for example accelerating growth in plants by premature drying. Furthermore, for increasing the fruit setting, delaying blossoming, extending the storage life of crops or for lending freeze resistance. The active substances of the formula (I) can also be used with advantage as heribicides in the extermination of tenacious weeds in the long term whenever their instant application does not exclude a diminution in yield of the plants being cultivated at the time of application.

The active substances of the formula (I) can be applied as pure active substance or together with carriers and/or other suitable additives. Suitable carriers and additives may be solid or liquid and correspond to the substances conventionally used in formulation technique, for example natural or regenerated mineral substances, solvents, diluents, dispersants, wetting agents, adhesives, thickeners, binders or fertilizers. It is also possible to add further biocidal compounds, which may belong, for example, to the class of the ureas, the saturated or unsaturated halogen fatty acids, halobenzonitriles, halobenzoic acids, carbamates, triazines, nitroalkylphenols, oragnic phosphoric acid compounds, phenoxyalkylcarboxylic acids, quaternary ammonium salts, arsenates, arsenites, borates or chlorates.

The herbicidal agents according to the invention can be used in the form of solutions, emulsions, suspensions, granulates or dusting agents. The methods of application depend on the end uses and must ensure a fine distribution of the active substance. Particularly in the case of the total destruction of plants, in premature drying out and in defoliation, the activity can be stimulated by the use of basically phytotoxic carriers, for example high-boiling mineral oil fractions or chlorinated hydrocarbons. On the other hand, the selectivity of the growth inhibition is in general of distinct importance when carriers are used that are inert towards the plants, for example in selective weed control.

To manufacture solutions solvents may be used especially alcohols, for example ethanol or isopropanol; ketones, for example acetone or cyclohexanone; aliphatic hydrocarbons, for example kerosenes; and cyclic hydrocarbons, for example, benzene, toluene, xylene, cyclohexane, tetrahydronaphthalene, alkylated naphthalene; in addition, chlorinated hydrocarbons, for example tetrachloroethane, ethylene chloride; and finally too, mineral and vegetable oils or mixture of the above-mentioned substances.

The aqueous preparations are preferably emulsions and suspensions. The active substances are homogenized in water as such as in one of the above-mentioned solvents, preferably with the aid of wetting or dispersing agents. Suitable cationic emulsifying or suspending agents are, for example, quaternary ammonium compounds; anionic agents are, for example, soaps, aliphatic long-chained sulphuric acid monoesters, aliphatic-aromatic sulphonic acids, long-chained alkoxyacetic acids; non-ionic agents are, for example, polyglycolethers of fatty alcohols or ethylene oxide condensation products with p-tert. alkylphenols. On the other hand, it is also possible to manufacture concentrates consisting of active substance, disposant and, if desired, solvent. Such concentrates can be diluted before use, for example, with water.

Dusting preparations may be manufactured by mixing or conjoint grinding of the active substance with a solid carrier. Such solid carriers are, for example, talcum, diatomaceous earth, kaolin, bentonite, calcium carbonate, boric acid, tricalcium phosphate, wool meal, coal and other materials of vegetable origin. Alternately, the substances may be absorbed deposited on to the carrier with a volatile solvent. By addition of wetting agents and protective colloids, pulverulent preparations and pastes may be made suspendible in water and used as sprays.

In many cases it is advantageous to apply granules to ensure a uniform release of active substances over a prolonged period of time. These granulates can be prepared by dissolving the active substance in an organic solvent, absorbing this solution by a granulated mineral, for example attapulgite or $SiO_2$, and removing the solvent. Alternatively, the granulates may also be prepared by mixing the compound of the formula I with polymerisable compounds, subjecting the mixture to a polymerisation that does not affect the active substances, and performing the granulation while the polymerisation is still in progress. The content of active substance in the above described agents lies between 0.1 to 95%, in which connection it should be mentioned that on application from aircraft or by means of other suitable application devices, concentrations of up to 99.5% are possible.

EXAMPLE 1

(A) 25.5 grams of 3,4-bis-trifluoromethyl-nitrobenzene in 200 ml. of isopropanol and 2 g. of Raney nickel are hydrogenated in an agitator flask. The uptake of hydrogen creasesafter approx. 3 hours. The catalyst is filtered off, the filtrate concentrated by evaporation and the residue distilled under vacuum. 19.2 grams of 3,4-bis-trifluoromethyl-aniline are obtained (e.g. 104–107° C./12 mm. Hg).

(B) The solution of 19 g. of 3,4-bis-trifluoromethyl-aniline in 100 ml. of ethyl acetate is added dropwise at −20° C. with stirring to a prepared solution of 30 g. of phosgene in 200 ml. of ethyl acetate. Stirring is continued overnight without cooling, then the solvent is distilled off and the residue fractionated under vacuum. 18.8 grams of 3,4-bis-trifluoromethyl-phenyl-isocyanate are obtained (B.P. 78–80° C./12 mm. Hg), which represents a compound not yet described in the literature.

(C) 14.7 grams of the phenylisocyanate obtained as described according to (B) are added to a solution of 7.5 g. of a 40% aqueous dimethylamine and 30 ml. of dioxane. After stirring for 5 minutes, a precipitate settles out by adding approx. 200 ml. of ice water. After filtering with suction and drying 15.7 of N-3,4-bis-trifluoromethyl-phenyl-N′,N′-dimethylurea are obtained (M.P. 118–119° C. after recrystallization from cyclohexane). The formula of this final product is

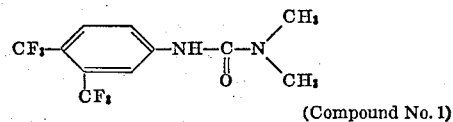

(Compound No. 1)

EXAMPLE 2

(A) Manufacture of 3,4-bis-trifluoromethylphenyl-isocyanate

To a ready prepared mixture of 8.5 ml. of thiophosgene, 100 ml. of water and 100 ml. of methylene chloride are added dropwise at 20° C. within approx. 1 hour 22.9 g. of 3,4-bis-trifluoromethylaniline dissolved in 25 ml. of methylene chloride. The reaction mixture is stirred overnight and then worked up. The organic layer is isolated, washed with water, dried over sodium sulphate and concentrated by evaporation. The residue is distilled under vacuum. 22 grams of 3,4-bis-trifluoromethylphenylisocyanate are obtained (B.P. 93–95° C./12 mm. Hg).

(B) Manufacture of N-3,4-bis-trifluoromethylsulphenyl-N′,N′-dimethyl-thiourea 15 grams of 3,4-bis-trifluoromethylphenylisocyanate in 20 ml. of dioxane are treated with 7.5 ml. of a 40% aqueous dimethylamine solution. After 15 minutes a precipitation forms by adding ice water. After suction filtration, washing the filtrate with water and subsequently drying it, 16.5 g. of the product are obtained (M.P. 119° C. after recrystallization from cyclohexane).

The compounds of the formula I obtained according to the previous Examples and further compounds of the formula I obtained in analogous manner are listed in the table below. The majority of the compounds correspond also to the narrower formula II.

| Compound No. | X | R₁ | R₂ | Melting point, °C. |
|---|---|---|---|---|
| 1 | O | CH₃ | CH₃ | 118–119 |
| 2 | O | H | CH₃ | 114–146 |
| 3 | O | —OCH₃ | CH₃ | 67–68 |
| 4 | O | n-C₄H₉ | CH₃ | 56–59 |
| 5 | O | —CH(CH₃)C≡CH | CH₃ | 113–114 |
| 6 | O | (tetrahydrofuryl) | | 157–159 |
| 7 | S | CH₃ | CH₃ | 119 |
| 8 | S | —OCH₃ | CH₃ | 107–109 |

EXAMPLE 4

Formulation—Dusting agent

Equal parts of an active substance according to the invention and precipitated silica are finely ground. By admixture with kaolin or talcum, dusting agents with preferably 1–6% content of active substance can be manufactured.

Wettable powder

To manufacture a wettable powder, the following components, for example, are mixed and finely ground:

50 parts of an active substance according to the invention
20 parts of highly adsorptive silica
25 parts of bolus alba (kaolin)
1.5 parts of sodium 1-benzyl-2-stearyl-benzimidazol-6,3′-disulphonate
3.5 parts of a reaction product of p.tert.octylphenol and ethylene oxide.

Emulsion concentrate

Easily soluble active substances can also be formulated in the form of an emulsion concentrate in accordance with the following prescription:

20 parts of active substance
70 parts of xylene
10 parts of a mixture of a reaction product of an alkylphenol with ethylene oxide and calcium dodecylbenzenesulphonate are mixed. A sprayable emulsion is obtained by diluting the mixture with water to the desired concentration.

Granulate 7.5 grams of one of the active substances of the formula I are dissolved in 100 ml. of acetone and the resulting acetonic solution added to 92 g. of granulated attapulgite (mesh size: 24/48 meshes/inch). The whole is well mixed and the solvent stripped off in a rotary evaporatur. A granulate containing 7.5% of active substance is obtained.

The herbicidal activity of the active substances according to the invention is confirmed by means of the following test:

In a greenhouse test plants are sown 1 cm. deep in pots containing sandy, humus clay. The treatment was carried out with an aqueous broth manufactured from a wettable powder containing 25% of active substance and in amounts of 0.1 to 1 liter per m.² or surface area. The concentration of the broth is in such case adjusted in such a way that amounts of active substance of 0.5;1; 2 and 4 kg. per hectare are applied to the surfaces of the pots (1 kg. per hectare corresponds to 0.1 g. per m.²).

The pots are left to stand at 22–25° C. and 50–70% rel. atmospheric humidity and moistened at regular intervals. The pre-emergent treatment is carried out immediately before sowing and evaluation made after 28 days. The post-emergent treatment is carried out 10 to 12 days after sowing, when the plant seeds have attained the 2- to 3-leaf stage. Evaluation of the results is made 15 days after the treatment.

Evaluation rating

9=normal state (plants as test plants not damaged)
1=plants totally killed off
8–2=intermediate stages of damage.

The active substance used in the following test was N-3,4-bis-trifluoromethylphenyl-N′,N′-dimethylurea (compound No. 1 of the table).

(1) PRE-EMERGENT TEST

| Test plant | Concentration of active substance, kg./ha. | | |
|---|---|---|---|
| | 0.5 | 1 | 4 |
| Useful plants: | | | |
| Zea (maize) | 9 | 9 | 5 |
| Sorghum hybridum | 8 | 8 | |
| Oryza (rice) | 7 | | |
| Grossypium (cotton) | 9 | 9 | 9 |
| Glycine (soya bean) | 9 | 8 | |
| Weeds: | | | |
| Poe trivialis | 2 | 2 | |
| Alopecurus myos | 4 | 3 | |
| Echinochloa crus galli | 1 | 1 | |
| Digitaria sanguin | 3 | 1 | |
| Setaria italica | 3 | 1 | |
| Amaranthus spec | 2 | 1 | |
| Sinapis alba | 1 | 1 | |
| Ipomea purpurea | 8 | 1 | |

As the above results indicate, the active substance of the invention is excellently suitable for selectively combating weeds in cotton cultures, and also in cultures of maize, soya and sorghum, in that in these cultures it effects the virtual to total destruction of weeds, especially of the grass and Panicum variety, even when used in the smallest concentration.

(2) POST-EMERGENT TEST

| Test plant | Concentration of active substance, kg./ha. | | |
|---|---|---|---|
| | 0.5 | 1 | 4 |
| Useful plants: | | | |
| Triticum (grain) | 8 | 7 | |
| Zea (maize) | 9 | 8 | 6 |
| Oryza (rice) | 8 | 7 | |
| Grossypium (cotton) | 8 | 7 | 6 |
| Weeds: | | | |
| Setaria italica | 1 | 1 | |
| Digitaria sang | 2 | 2 | |
| Echinochloa crus galli | 3 | 2 | |
| Amaranthus retrofl | 1 | 1 | |
| Papaver rhoeas | 1 | 1 | |
| Sinapis alba | 1 | 1 | |
| Vicia sativa | 4 | 2 | |
| Matricaria | 4 | 1 | |

Here too the results indicate the excellent suitability of the compound No. 1 in selectively combating weeds as post-emergent agent, especially in maize and cotton, but also on grain and rice, and the good activity against grasses and Dicotyledones.

What we claim is:

1. Compounds of the formula

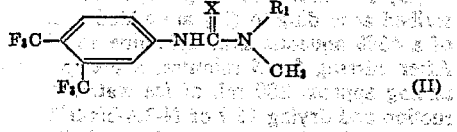

(II)

wherein X represents oxygen or sulphur and $R_1$ represents hydrogen, $C_1$–$C_4$ alkyl or isobutynyl.

2. Compounds according to claim 1 in which $R_1$ represents hydrogen, methyl or isobutynyl.

3. The compound according to claim 2 in which X represents oxygen and $R_1$ represents methyl.

References Cited

UNITED STATES PATENTS 3,134,665   5/1964   Basel et al.   71—120
3,244,504   4/1966   Martin et al.   71—120

LEON ZITVER, Primary Examiner

M. W. GLYNN, Assistant Examiner

U.S. Cl. X.R.

71—88, 90, 99, 120; 260—243 R, 247.1, 247.2, 293.85, 293.86, 453 R, 454, 552 R